Nov. 17, 1970     W. F. PAUL ET AL     3,540,809
VIBRATION DAMPED HELICOPTER ROTOR

Filed Sept. 20, 1968     4 Sheets-Sheet 1

INVENTORS
WILLIAM F. PAUL
KENNETH C. MARD
BY Vernon F. Hauschild
ATTORNEY

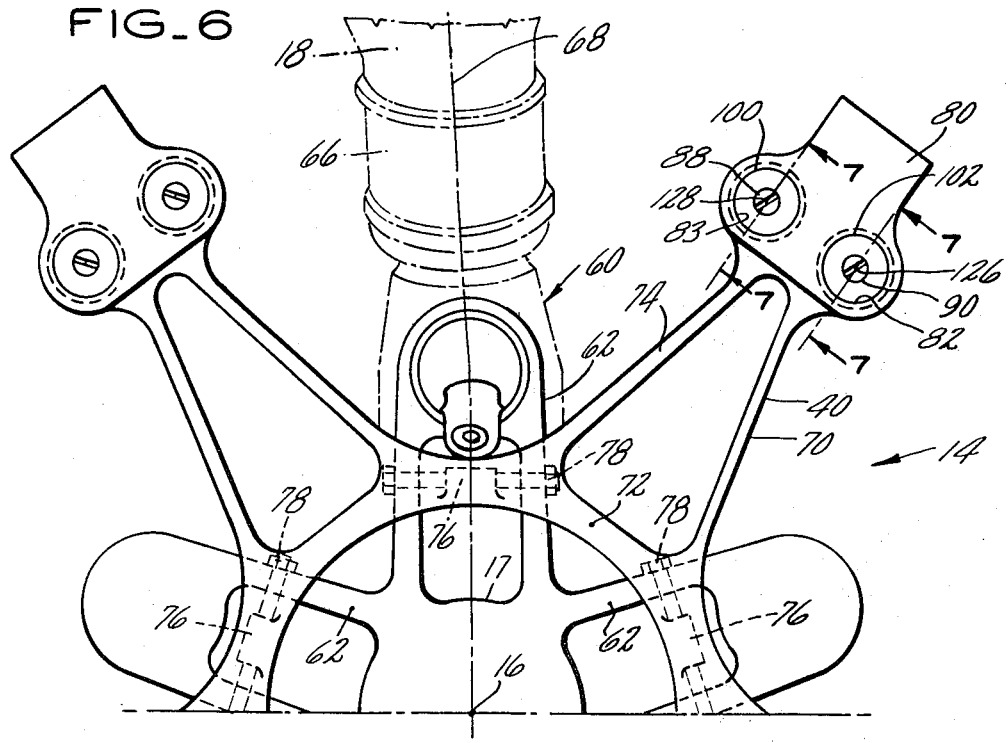

United States Patent Office 3,540,809
Patented Nov. 17, 1970

3,540,809
VIBRATION DAMPED HELICOPTER ROTOR
William F. Paul, Trumbull, and Kenneth C. Mard, Stratford, Conn., assignors to United Aircraft Corporation, East Hartford, Conn., a corporation of Delaware
Filed Sept. 20, 1968, Ser. No. 761,187
Int. Cl. B64c 27/32
U.S. Cl. 416—1          20 Claims

ABSTRACT OF THE DISCLOSURE

A multibladed helicopter rotor which carries at least one series of at least three bifilar vibration dampers therewith tuned to eliminate in-plane rotor vibrations which would otherwise be transmitted to the helicopter fuselage.

BACKGROUND OF THE INVENTION

Field of invention

This invention relates to helicopters and more particularly to helicopters in which in-plane rotor vibrations create vertical fuselage vibrations and to apparatus for damping such vibrations. The vibration damping apparatus consists of at least three bifilar counterweights connected to the helicopter rotor for rotation therewith in a plane perpendicular to the rotor axis of rotation, and which dampers are tuned to damp or eliminate in-plane rotor forces and vibration, i.e., forces and vibrations in the plane of the rotor.

Description of the prior art

In the past, attempts have been made to reduce or eliminate fuselage vibrations by changing the natural frequency of the aircraft through structural changes so as to be substantially different from the excitation frequency of the rotor but this proved difficult to accomplish and invariably added excessive weight. Discretely positioned vibration absorbers have been placed in the fuselage per se, however, this has not proved successful since, with the advent of larger more powerful helicopters, the areas of vibration problems are several, thus bringing about the need for many such vibration absorbers with their mechanical complexity and weight addition.

While vibration dampers have been used in helicopter rotors in the past, none of the prior act teaching is practical or acceptable for the modern helicopter with five or more blades. Kelley et al. Pat. No. 3,035,643, shows such a vibration damper but the Kelley patent is practical for a helicopter rotor having two blades. Jenney Pat. No. 3,372,758, is an improvement over the Kelley patent but both patents are not practical for use with helicopter rotors having many blades, i.e., more than five blades. Accordingly, none of the prior art is effective and practical for the modern high power helicopter having five or more blades, nor is the prior art as effective in damping rotor vibrations regardless of the number of blades.

SUMMARY OF THE INVENTION

A primary object of the present invention is to provide apparatus to damp the in-plane vibrations of a helicopter rotor so as to prevent the transmission of these in-plane rotor vibrations to the helicopter fuselage through a moment action, and thereby eliminate the problems of pilot performance, passenger comfort and structural integrity which such vibrations create.

In accordance with the present invention, at least three bifilar vibration dampers are caused to rotate with the helicopter rotor in a plane perpendicular to the rotor axis of rotation, and are tuned to cancel rotor in-plane vibrations.

In accordance with a further aspect of the invention, more than one set of three or more bifilar vibration dampers may be utilized, with each set tuned to damp a different frequency rotor vibration.

In accordance with a further aspect of the present invention a vibration damper is provided which is effective without respect to the number of blades to the rotor and which continues to be effective even when the excitation frequency ($F_E$) of the rotor changes.

In accordance with a further aspect of this invention, a vibration damper is provided which is the only known vibration damper capable of damping vibrations on helicopter rotors having a large number of blades, for example, five blades or more.

In accordance with a further aspect of this invention, the amplification factor of the bifilar vibration damper is maintained high by avoiding face-to-face contact between the relatively movable damper parts. This is accomplished by utilizing a selectively shaped spacer between the relatively movable parts to insure line contact only and thereby minimize friction therebetween.

In accordance with still a further aspect of the present invention, vibration dampers are provided which are capable of damping vibrations in the helicopter rotor which are equal to the number of rotor blades plus one ($n+1$) and the number of rotor blades minus one ($n-1$) times rotor r.p.m. so as to damp fuselage vibrations equal to the number of rotor blades times rotor revolutions per minute ($n \times $r.p.m.).

BRIEF DESCRIPTION OF THE DRAWINGS

FIG. 6 is a partial plan view of a helicopter rotor utilizing our rotor vibration damper.

FIG. 7 is a view taken along line 7—7 of FIG. 6.

FIG. 8 is similar to FIG. 7 but shows the bifilar vibration damper in its operating position.

DESCRIPTION OF THE PREFERRED EMBODIMENT

Figure 1:
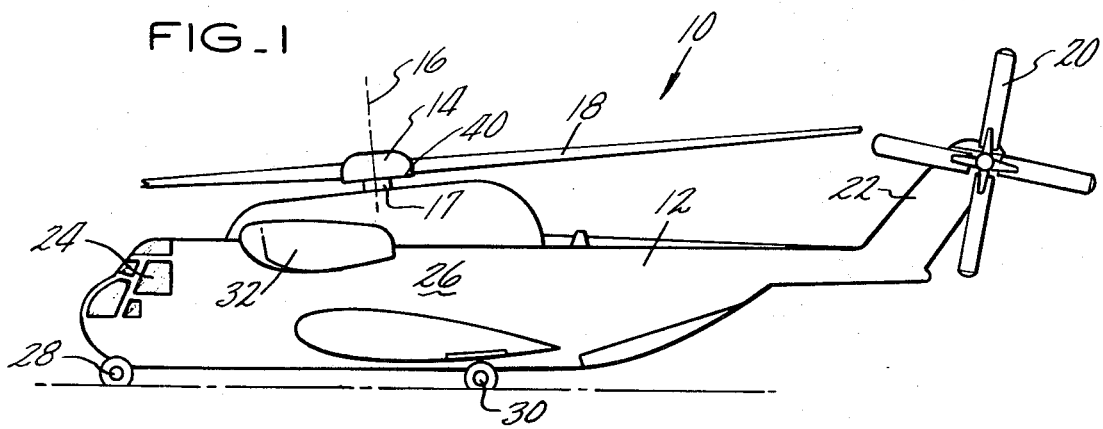
FIG. 1 is a showing of a modern helicopter utilizing the rotor vibration damper taught herein.

Referring to FIG. 1 we see modern helicopter 10 which includes fuselage 12 with rotor 14 projecting therefrom for rotation about axis 16. Rotor 14 includes a plurality of blades 18 projecting radially therefrom for rotation therewith and which are capable of cyclic and collective pitch variation to control the flight of the helicopter. Tail rotor 20 is supported from tail section 22 to counteract the torque of main rotor 14. Fuselage 12 envelops the pilot compartment 24 and the passenger or cargo compartment 26. Fuselage 12 is supported from the runway by landing gear 28 and 30, which may be of the tricycle type.

Rotor 14 is driven by one or more engines 32, which are connected to rotor 14 through conventional drive mechanism which includes rotor drive shaft 17. Rotor 14 may be of the type more particularly described in U.S. Patent No. 3,097,701, engines 32 may be of the type more particularly described in U.S. Patents Nos. 2,711,631 or 2,747,367, and the rotor drive system connecting engine 32 to rotor 14 may be of the type described in greater particularity in U.S. Patent No. 2,979,968.

The rotation of rotor 14 creates vibrations which are transmitted to fuselage 12. Fuselage vibration in excess of certain limits causes passenger discomfort, causes the pilot to experience sufficient discomfort that he is not able to perform his normally required functions, and threatens the structural integrity of the aircraft.

It is accordingly the purpose of this invention to dampen or eliminate rotor airframe and aircraft component vibrations and we accomplish this by attaching vibration damper system 40 to rotor 14 for rotation therewith. The structure and operation of vibration damper system 40 will be described in detail hereinafter.

To best understand the structure and function of vibration damper system 40, it is deemed advisable to explain the chain of development and testing events which brought us to this invention.

In some earlier helicopters, fuselage vibrations at low speeds were encountered in the magnitude of 1.5 g. and at cruise in the magnitude of .5 g., whereas acceptable vibration level was .15 g. Because fuselage vibrations of this magnitude seriously impeded the performance of the pilot, brought discomfort to the passengers, and challenged the structural integrity of the aircraft, an intensive program was inaugurated to substantially reduce or eliminate these vibrations. It was expected that the problem was one of critical vibration in that the excitation frequency of the rotor was very close to the natural frequency of the aircraft or fuselage. Therefore, our initial efforts were directed to changing the natural frequency of the aircraft, and particularly the fuselage, in an effort to eliminate the critical vibration problem. To change the natural frequency of the aircraft, structural changes were made such as stiffening the pilot cockpit 24 and the tail section 22 of the aircraft to thereby alter the flexibility thereof, adding strength members between parts which we felt had to be flexible, and adding or subtracting masses from certain problem areas. These initial efforts proved ineffective from a practical standpoint because they added substantial weight to the aircraft, required mechanical complication, and because the frequency changes brought about by these structural changes were difficult to predict.

Our next approach was to mount one or more vibration absorbers of the spring-mass type in the cockpit area 24 in the regions where vibration was known to be high. This proved to be an acceptable solution in aircraft where the pilot cockpit vibrations were the only vibrations of concern.

As the load carrying capacity and the passenger carrying capacity and the control demands on helicopters increased, larger aircraft with larger rotors having greater number of blades and driven by more powerful engines had to be used. In these more sophisticated aircraft, there were several areas within the fuselage which had to be protected from excessive vibration, for example, the sonar area, the passenger area, the aircraft tail region, as well as the pilot cockpit. Past experience convinced us that structural changes would not solve the vibration problem in this more sophisticated helicopter. While selectively positioned vibration dampers in the fuselage helped in less sophisticated helicopters which had a single vibration problem region, it was felt that the application of infuselage vibration dampers would not be satisfactory in the helicopters having many vibration problem areas because a great many vibration absorbers would have to be used and this would add a great deal of weight to the ship, excessive maintenance burden, interfere with easy cargo and crew access, and present substantial mechanical problems in connecting the absorbers to the ship. Such a solution would also present problems in maintaining the mechanically complex vibration absorbers. In addition, it was realized that while the addition of vibration absorbers in a particular section of the fuselage tended to decrease the vibrations in that section of the fuselage, vibrations usually increase elsewhere in the aircraft. Also, it was our prognosis that, at best, we could achieve a helicopter which was marginally acceptable by using these infuselage vibration absorbers. However, because we knew of no other solution or approach, we first attempted to solve the vibration problems by using infuselage absorbers and found, to our surprise, that during certain phases of operation of the helicopter, such as approach prior to landing when power is increased and rotor r.p.m. reduced thereby, the helicopter or ship would be operating at a new excitation frequency different from the absorbing frequency of the absorbers and therefore the absorbers were not only ineffective but were adding to the overall vibration of the ship and this brought about definitely unacceptable vibration levels.

Due to the complex nature of helicopter rotor and fuselage vibrations and because there were no known solutions to the vibration problem, we embarked upon a research investigation to determine the exact nature and cause of helicopter vibrations. This investigation initially consisted of shake tests of the helicopter on the ground and these shake tests brought us to an unexpected realization. Because the objectionable vibrations in the helicopter fuselage were vertical vibrations, it had always been thought that vertical rotor vibrations were the cause thereof. Our shake tests indicated, quite unexpectedly, that in-plane forces in the rotor might be causing the vertical fuselage vibrations. To investigate the possibility that in-plane forces might be the cause of the problem, a helicopter was instrumented so as to have vibration pickups selectively placed throughout the rotor to determine the location, magnitude and direction of the forces which existed in the rotor during operation. Our flight testing of this helicopter so instrumented revealed that there was a very large in-plane rotor acceleration in the rotor hub, in the order of 3 g. The entire rotor hub is actually caused to move around by these in-plane forces so that these forces are sufficient to cause the entire rotor to experience in-plane vibrations. This flight testing convinced us that the vertical fuselage vibrations of concern were being caused by in-plane forces and vibrations in the rotor, and were being transmitted to the fuselage by the moment which existed between the rotor and the fuselage.

Our first attempt at trying to prevent in-plane motion of the rotor was to install support struts between the fuselage and the rotor support section. This did not help.

It was therefore decided to consider the use of vibration absorbers on the rotor to damp or eliminate these rotor in-plane forces and vibrations. In deciding what kind of vibration absorbers we were going to use on the rotor, we had to determine how much mass we were concerned with, the tuning frequency we were concerned with, and the actual damper concept which could perform the damping function practically. The type of vibration absorbers taught in U.S. Patent No. 3,035,643 and 3,372,758 were known to be capable of damping vibrations in a practical manner on rotors which have a small number of blades, and could not be used on the current rotors which include at least five blades and derivative helicopter rotors which may include ten or more blades.

Figure 13:
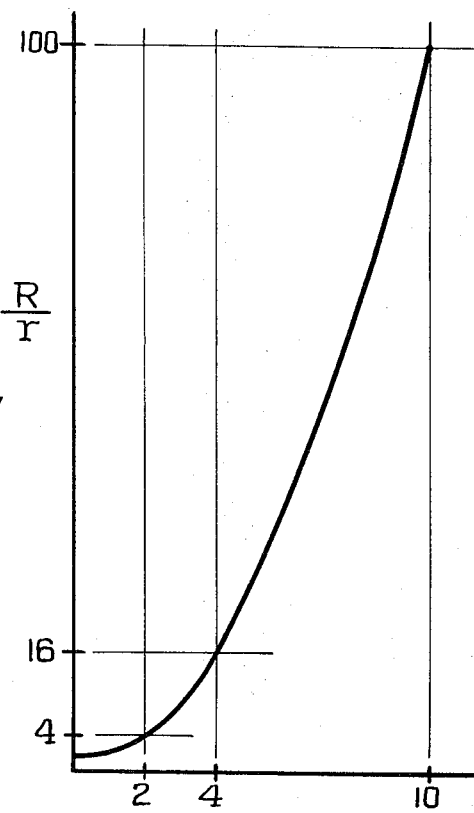
FIG. 13 is a plot of the rotor ($n \pm 1$) excitation frequency per revolution, where ($n$) equals the number of blades and the ratio of the distance between the rotor axis of rotation and the absorber pivot point (R) and the distance between this pivot point and the absorber center of gravity ($r$).

The limitations with respect to the number of blades which the vibration absorbers taught in these two patents can achieve is best illustrated by viewing FIG. 13. With respect to Pat. No. 3,035,643, it can be demonstrated that the vibration absorbers taught therein are practical for a two bladed rotor only because the pendulum radius $(r)$ is equal to the distance $(R)$ from the center of rotation to the pendulum pivot point. This provides a 1/rev. tuning frequency which is uniquely suited to a two bladed rotor $[(n-1)/\text{rev.}]$ and to the fly bar control system used. As the number of blades increases, the pivot distance from the center of rotation to the pendulum pivot point increases substantially providing an unacceptable solution from a flexibility, length, and weight standpoint. Had we attempted to meet the ratios required by decreasing $(r)$, we would have encountered difficulties from a structural integrity standpoint with the pendulum mass and/or the mass pivot point may fall within the mass. This can be seen by viewing FIG. 13.

While Pat. No. 3,372,758 has overcome this two blade limitation, by effectively increasing the magnitude of $(R)$ by the use of a universal joint, he nonetheless is bound by limitations with respect to $(r)$. Viewing FIG. 13, it will be noted that for a five bladed helicopter rotor sensitive to the $(n-1)$ excitation frequency, the ratio $R \div r$ is 16. Structural practicality requires that $(r)$ be at least 4 inches and it will therefore be seen that for a 4/rev. excitation frequency cancellation $(R)$ must be 64 inches, which is quite impractical. The larger more powerful helicopters can have many rotor blades and it will be seen by viewing FIG. 13 and the $R \div r$ ratio plotted therein that for a ten/rev. excitation frequency, such as would be found in an 11 bladed rotor sensitive to the $(n-1)$ excitation frequency, this ratio must be 100 and, maintaining the same 4 inch $(r)$ for purposes of structural practicality, $(R)$ becomes 400 inches which is unobtainable. Assuming, arguendo, that we could use an $(r)$ of ½ inch, the same calculations would show that $(R)$ must be at least 50 inches and it can be seen that this is not a practical radius for the construction taught in Pat. No. 3,372,758 from a flexibility and weight standpoint. In other words, with an $(R)$ this size, the damper support arm would have to be made extremely heavy to have the proper combination of rigidity to maintain the damper in tune at all rotor rotational speeds. It will therefore be evident that these two prior art patents have a definite limitation with respect to the number of blades in the helicopter with which they are effective. Contrary to this, and as explained in greater particularity hereinafter, the subject matter of this invention includes no such limitation.

Figure 2A:
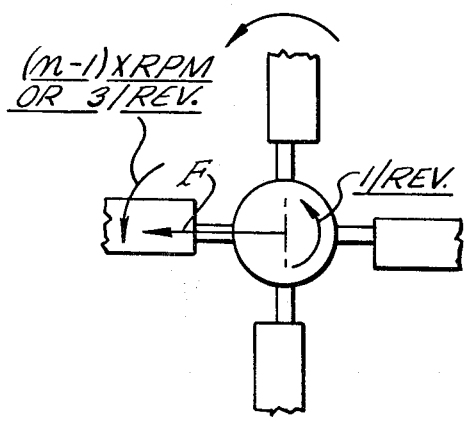
FIGS. 2a and 2b are schematic plan views of a four bladed helicopter rotor illustrating the vibration force created thereby and the direction of rotation of the most troublesome rotor vibrations.
Figure 2B:
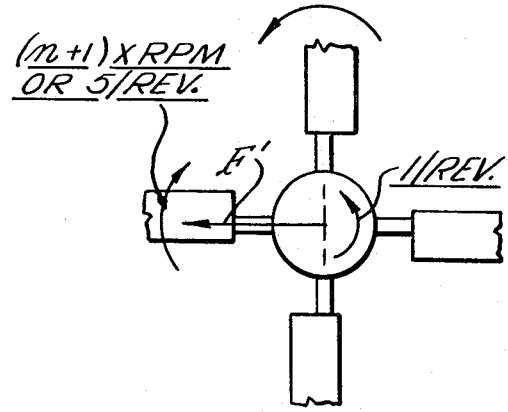

In our quest for a solution to the in-plane rotor forces and vibration problem, we knew that all vibration other than $(n+1)$ frequency vibrations and $(n-1)$ frequency vibrations cancel. By $(n+1)$ vibrations we mean the vibrations which oscillate at a frequency equal to the number of blades plus one times the rotor r.p.m., i.e., $(n+1) \times$ rotor r.p.m. and by $(n-1)$ vibrations, we mean vibrations which oscillate at a speed equal to the number of blades minus one times rotor r.p.m., i.e., $(n-1) \times$ rotor r.p.m. By referring to FIGS. 2a and 2b it will be shown that both the $(n+1)$ and the $(n-1)$ vibrations just mentioned produce the same vertical vibrations in the fuselage and that this vibration is equal to the number of rotor blade times rotor r.p.m., i.e., $n \times$ rotor r.p.m. FIG. 2a illustrates a four bladed rotor rotating in a counterclockwise direction and having a vibration force F rotating at 3 times rotor r.p.m., which is commonly referred to as 3/rev. These are the $(n-1)$ vibrations in which $n$ is the number of blades, in this instance four. It will be noted from FIG. 2a that the $(n-1)$ vibrations rotate in the direction of rotor rotation and since they emanate from and are therefore rotating with the rotor, their speed of rotation is therefore additive to the 1/rev. of the rotor to produce 4/rev. vertical vibration in the fuselage. This vertical fuselage vibration caused by the rotor $(n-1)$ vibration accordingly has a frequency of $n \times$ rotor r.p.m. Referring to FIG. 2b we see a four bladed rotor rotating in a counterclockwise direction and including force F' created by in-plane vibrations with a 5 per/rev. frequency in a clockwise direction. It will be noted that this 5 per/rev. vibration is actually the $(n+1)$ oscillation where $n$ is again the number of blades. In the FIG. 2b situation, since the rotor and the $(n+1)$ vibrations are rotating in opposite directions they are subtracted and therefore impart a 4 per/rev. or $n \times$ rotor r.p.m. vertical vibration in the helicopter due to the moment effect previously described. It will therefore be seen that both the $(n+1)$ and $(n-1)$ rotor in-plane vibrations impart $(n) \times$ r.p.m. vertical vibrations in the nonrotating helicopter system of coordinates.

Our flight testing of an instrumented five bladed rotor showed not only an in-plane vibration acceleration of 3 $g$ but that the frequency of the force vector F which was caused by the vibrations was 4/rev. We accordingly knew that it was the rotor $(n-1)$ frequency vibration which was the souce of the trouble and which was producing the 5/rev., i.e., $n \times$ rotor r.p.m., vertical vibrations in the fuselage.

It was realized that for an absorber on the rotor to effectively damp and eliminate these in-plane vibratory forces, the counteracting force created by the absorbers must be at least as great as the force creating the vibrations. This requirement is expressed in the following equations:

Equation 1

$$F_A \geq F_e$$

or

Equation 2

$$m_A a_A \geq F_e (n-1) \text{ (rotor r.p.m.)}$$

Where $F_A$ is the force of the absorber, $F_e$ is the rotor excitation force causing the vibrations, $m_A$ is the mass of the absorber, $a_A$ is the acceleration of the absorber, and $n$ is the number of blades in the rotor. In other words the inertial force of the absorber which is mass $x$ acceleration of the absorber must be equal to or greater than the excitation force $(F_e)$.

In deciding what type of damper to use, it was realized that a spring mass absorber would not be acceptable because such a mass would always go off center and centrifugal force would push it further off center to establish an unbalance in the rotor.

Figure 3:
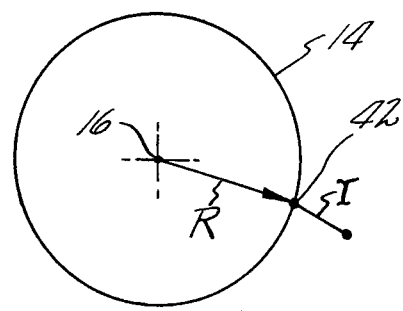
FIG. 3 is a diagrammatic representation of a helicopter rotor carrying a pendulum type vibration damper.
Figure 5:
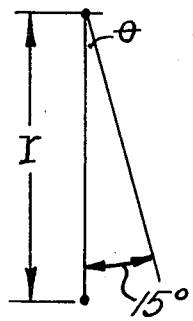
FIG. 5 is an analytical representation of a pendulous vibration damper used in determining absorber acceleration.

We then considered using a pendulum type of absorber of the type disclosed in U.S. Pat. No. 3,035,643 and 3,372,758 but found that they were impractical as previously stated and as illustrated by the following equations as they relate to FIG. 3. In FIG. 3, R is equal to the distance between the rotor axis of rotation 16 and the pivot connection 42 between the rotor hub and the pendulum damper, and $(r)$ is the radius of the pendulum damper or the distance between the pivot point 42 between the rotor, and the damper and the damper center of gravity:

Equation 3

$$W_T = \Omega \sqrt{\frac{R}{r}}$$

Where $W_T$ is tuned frequency or the frequency of the excitation force to be damped, $\Omega$ is rotor rotational speed and R and r are the same as in FIG. 3. By substitution, since $W_T$ equals $4\Omega$, we can write the following equation:

Equation 4

$$4\Omega = \Omega\sqrt{\frac{R}{r}}$$

Solving Equation 4 we get:

Equation 5

$$\sqrt{\frac{R}{r}} = 4, \text{ or } \frac{R}{r} = 16$$

The maximum practical radius R is about 24 inches and we determine the radius of the pendulum $r$, to be 1.5 inches. Such a small damper radius $r$ compared with the size of the damper weight would present a substantial mechanical problem with respect to pivotally connecting the damper to the rotor at pivot point 42 and, having it function properly and keeping the geometric and center of gravity tolerances acceptably small to preclude mistuning in production.

Figure 4:
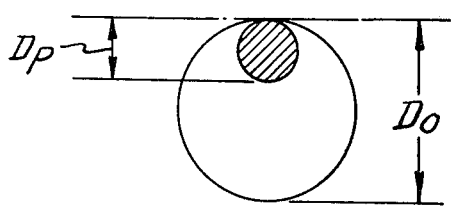
FIG. 4 is a diagrammatic representation of a portion of a bifilar vibration damper to illustrate how the effective radius thereof is ascertained.

This brought us to consider the bifilar damper. It is a characteristic of the bifilar damper, as best shown in FIG. 4 and the following equations, that we can obtain the necessary mass utilization with very small effective radius, $r$. In FIG. 4 $D_o$ is equal to the diameter of the counterweight aperture and $D_p$ is the diameter of the bifilar roll pin, and both are shown in FIG. 7.

It can be shown that the effective radius, $r$ of Equation 3 is equal to $D_o$ minus $D_p$ in a bifilar vibration damper. This relationship is expressed in the following equation:

Equation 6

$$W_T = \Omega\sqrt{\frac{R}{D_o - D_p}}$$

By comparing Equation 6 with Equations 3, 4, and 5 it will be noted that it will be quite possible to get effective damper mass utilization with this very small effective $r$ equal to 1.5 inches by merely selecting the diameters $D_o$ and $D_p$ to make their difference equal to 1.5 inches. In fact, the effective radius could be chosen as small as desired by proper selection of these diameters.

In addition to being able to obtain a very small effective radius, $r$, by merely proper selection of the diameters $D_o$ and $D_p$ of FIG. 4 in Equation 6, the bifilar vibration damper has another important advantage in that when the rotor frequency or r.p.m. changes, for example when the helicopter is approaching to land, the bifilar absorber stays in tune with the rotor r.p.m. as the r.p.m. changes. This is accomplished by mounting the bifilar absorber rigidly to the rotor or to short extension arms which permit the constant relationship between turning and rotor speed.

Having decided to try to use a bifilar vibration damper, it was then necessary to determine whether the bifilar vibration damper would be applicable to a helicopter rotor installation by ascertaining the absorber acceleration and the absorber mass which would be required to damp the rotor excitation force shown in Equations 1 and 2. In the past, bifilar vibration dampers have been used to damp torsional vibrations in a crankshaft such as in Chilton Pat. No. 2,112,984, however, there is a tremendous difference between the mechanics, the vibrations and the mass involved in a crankshaft as opposed to a helicopter rotor and the fact that such a vibration absorber had been suggested for use on crankshafts gave no assurance that they would be usable on helicopter rotors.

In determining the size of the absorber, it was first necessary to establish a total absorber force requirement. Our instrumented helicopter flights first indicated that the in-plane $(n-1)$/rev. excitation force was $\pm 1300\#$. The value of R was chosen as 12" in order to retain the absorber within the rotor hub radius. Establishing a ratio of $R/r = 16$ from Equation 5, the value of $(r)$ is determined to be .75". A maximum operational vibrating angular motion was chosen as $\pm 30°$ in order to avoid excessive detuning caused by the nonlinear characteristics of the pendulum at high angles. Using the formula:

Equation 7

$$a_A = \frac{r(\theta)(W_T{}^2)}{386}$$

and substituting $$r = .75''$$

$$\theta = 30° \times \frac{\pi}{180°} \text{ radians}$$

$$W_T = n\Omega$$

$$W_T{}^2 = [(n)(3.38)(2\pi)]^2$$

we get $$a_A = \pm 7.3 \, g$$

now using the formula:

$$F_A = M_A a_A$$

$$1300\# = W_A(7.3) \, g$$

$$W_A = 178\#$$

Therefore the absorber weight was fixed at 180#.

For effective damping, there must be at least three absorbers mounted on the rotor because this provides polar symmetry which can cancel both longitudinal and lateral rotor forces or any combination thereof at the same time. We could have accordingly used three counterweights each weighing 60 lbs. so as to make up the total weight of 180 lbs. for $m_A$, however, we decided to use six counterweights each weighing 30 lbs. This gave us the opportunity of tuning three of our counterweights to absorb the $(n-1)$ frequency in-plane rotor vibrations and the remaining three counterweights to absorb the $(n+1)$ frequency in-plane rotor vibrations utilizing equations comparable to Equation 2.

It is desirable but not necessary to have the absorbers spaced equally circumferentially.

Figure 12:
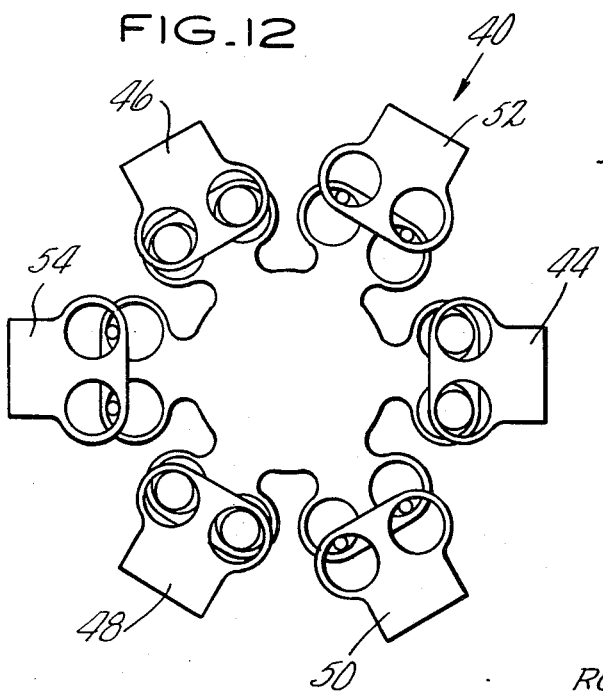
FIG. 12 is a schematic planned view of our vibration damper system used on a helicopter rotor with three bifilar vibration dampers tuned to absorb a particular in-plane rotor frequency and the remaining three bifilar vibration dampers tuned to absorb a different in-plane rotor frequency.

Such an arrangement is shown in FIG. 12 in which counterweights 44, 46 and 48 are tuned to absorb the $(n-1)$ rotor frequency and counterweights 50, 52 and 54 are tuned to absorb the $(n+1)$ rotor vibrations.

It will therefore be seen that our research and development work determined, quite unexpectedly, that bifilar counterweights could be used to absorb the in-plane vibrations of the rotor so as to damp the vertical vibrations in the fuselage and this solved the long standing problem which the numerous previous efforts described above failed to accomplish.

The use of bifilar counterweights to damp the in-plane rotor vibrations have proven to be particularly useful in helicopters in which the fuselage is sensitive to rotor in-plane forces and insensitive to rotor vertical forces. We have found that some helicopters are particularly sensitive to rotor vertical forces and therefore elimination of the rotor in-plane forces and vibrations does not eliminate vertical fuselage vibrations in these helicopters.

In helicopter rotors where frontal area is not a problem, it would be possible to reduce the total weight of the counterweights by increasing the distance R which the counterweight is mounted from the rotor axis of rotation. For example, if that distance could be doubled, the total mass of the counterweights could be reduced by one half.

As a practical matter, our bifilar absorber system for the five bladed helicopter under consideration added 156 lbs. to the weight of the helicopter, however, removal of the infuselage vibration dampers which were previously used brought about an overall helicopter weight saving of about 80 lbs. when these infuselage absorbers were replaced by the bifilar absorber system.

Accordingly, in addition to constituting a weight saving as just explained, our bifilar vibration absorber system also brought the helicopters the advantage of better vibration damping in that the tuning of the bifilar dampers changes as the rotor r.p.m. changes, and, in addition, the fuselage vibration damping is more effective than has been able to be accomplished in the past, and therefore there is a reduction in stress and vibration on the more critical fuselage parts.

FIG. 6 shows a portion of a helicopter rotor 14, which is mounted for rotation about axis of rotation 16 and driven by rotor drive shaft 17. The central part of rotor 14 is rotor hub 60 which includes a number of radially projecting arm or plate members 62 projecting therefrom for rotation therewith and to which rotor blades 18 attach in either rigid or articulated fashion through sleeve and spindle assembly 66. Rotor blades 18 are preferably mounted for pitch change motion about feathering axis 68 and to be capable of changing pitch both cyclically and collectively.

Vibration damper assembly 40 is mounted for rotation with rotor 14 since it is connected to hub assembly 60. As best shown in FIG. 6, vibration damper assembly 40 includes star shaped support member 70 which has central ring member 72 concentrically positioned about axis 16 with star point members 74 projecting radially therefrom and equally spaced circumferentially about axis 16 so as to be in a plane perpendicular to axis 16. Lugs 76 project downwardly from ring portion 72 of star support 70 and are bolted directly to plate members 62 of hub assembly 60 by bolt assembly 78. It will therefore be seen that star support member 70 of vibration damper assembly 40 is mounted for rotation with rotor hub assembly 60 and hence rotor 14 in a plane perpendicular to axis 16.

A bifilar counterweight assembly 80 is positioned at the outer end of each of the star point sections 74 of support member 70. It will be noted that there will be a total of 6 bifilar vibration damper assemblies 80 in the complete vibration damper unit 40 in the FIG. 6 configuration.

FIG. 7 is a section taken through either section line 7—7 of FIG. 6 and will be used to explain the construction of the bifilar damper 80, but it should be noted that the damper will not be positioned in the FIG. 7 position during operation but the FIG. 7 position has been selected for ease of explanation. From FIG. 7 we see that the radially projecting arm 74 of support member 70 has substantially circular aperture 82 therein and may have bushing ring 84 therewithin. It must be borne in mind that there are two such apertures in each of the star point support sections 74 since the pendulous or weighted portion 86 is connected to and supported from support member 70 by two roll pins 88 and 90. Roll pin 90 only is shown in FIG. 7 but it should be borne in mind that roll pin 88 is identical thereto and connected to support member 70 in precisely the same fashion so that FIG. 7 actually represents a showing through either section line 7—7 of FIG. 6. It will be noted that pendulous member 86 is of U-shaped cross section and includes two side plates 92 and 94 which are joined together through weight portion 96 with one side plate member on each the top and bottom side of support member 70. Side plates 92 and 94 have substantially circular apertures 98 and 100 therein, respectively, and these apertures 98 and 100 are substantially the same diameter as aperture 82. These apertures may include bushing rings 102 and 104. Roll pin 90 extends through apertures 98, 82 and 100 and serves to connect the pendulous member 86 to support member 70 in rolling fashion. Roll pin 90 includes bolt member 106 which has nut member 108 threadably connected to one end thereof to position cylindrical washers 110, 112 and 114 and annular spacer members 116 and 118 therebetween. Viewing FIG. 7 it will be noted that plane 120 extends through bifilar damper 80 and this plane is perpendicular to axis of rotation 16 and is the plane or is parallel to the plane in which the rotor in-plane forces and vibrations occur. Side plate members 92 and 94 are spaced from support member 70 as to define spacing distances 122 and 124 therebetween. Annular spacer members 116 and 118 are dimensioned to be thickest adjacent bolt 106 and taper outwardly therefrom to be of minimum thickness at their outer diameters. As shown in FIG. 7, rolling pin 90 and apertures 98, 82 and 100 are concentric about axis 126. As best shown in FIG. 6 axis 126 and axis 128, about which apertures 82 and 83 are concentrically positioned are parallel to one another and to axis of rotation 16 and are perpendicular to plane 120. Although during operation, roll pins 88 and 90 and counterweight member 86 move from their FIG. 7 position to their FIG. 8 position, it should be noted that apertures 82 and 83 of support member 70 remain concentric about parallel axis 126 and 128 at all times and these axes are equally distant from and parallel to axis 16.

FIG. 8 shows the bifilar damper 80 in its operative position when damper assembly 40 is rotating with rotor assembly 14 about axis of rotation 16. In this condition centrifugal force has thrown pendulous member 86 radially outwardly along plane 120 and the pendulous member 86 is supported from support member 70 by the two roll pins 88 and 90 so that a rolling pendulous and vibration absorbing motion is permitted between the pendulous member 86 and the support member 70 through the rolling motion of pins 88 and 90.

Our experience shows that all of our calculations relative to rotor vibration and their absorption are correct and predictable provided that friction in the absorber is held to a minimum. Friction between pendulous member 86 and support member 70 completely destroys absorber effectiveness. For example, considering all bushings removed for ease of explanation, if surfaces 130 or 132 of side surface members 92 and 94 were to engage surfaces 134 or 136, respectively, of support member 70 in face-to-face contact, the friction created thereby would be so high that the amplification factor of the absorber would be completely destroyed and the absorber would be useless. We therefore found it necessary to eliminate any possibility of face-to-face contact between these relatively movable parts 70 and 86 and designed wedge shaped annular spacer members 116 and 118 to fit into spaces 124 and 126 between these surfaces to insure line contact only between these spacers 116 and 118 and relatively movable members 70 and 86. It is important that the thickness of spacers 116 and 118 at their maximum width adjacent pin 90 be less than spacing distances 124 and 126 to avoid binding. In operation, it will be evident that the only contact which will occur between support member 70 and pendulous member 86 and the wedge shaped spaces 116 and 118 will be line contact between the outer periphery of apertures 82, 98 and 100 and the tapering sides of spacers 116 and 118. With pendulous member 86 in its operative position, this line contact will occur when lateral relative motion of these parts occurs along parallel axes 126 of aperture 82, 140 of pin 90, and 142 of apertures 98 and 100. This line contact between edge 144 of aperture 98 and wedge surface 146 of spacer 118, edge 148 of aperture 82 and surface 150 of spacer 118, or edge 152 of aperture 82 and surface 154 of spacer 116 or edge 156 of aperture 100 and edge 158 of spacer 116. Accordingly, nothing other than line contact and hence minimum friction contact will take place between the relatively movable parts of bifilar vibration damper 80 as pendulous member 86 moves in vibration damping fashion with respect to support member 70 due to the action of roll pins 88 and 90. By this pendulum motion of pendulous members 86 of all of the bifilar vibration dampers 80 which lie in plane 120 perpendicular to rotor axis of rotation 16, the in-plane vibrations of rotor 14 are damped and absorbed.

Figure 9:
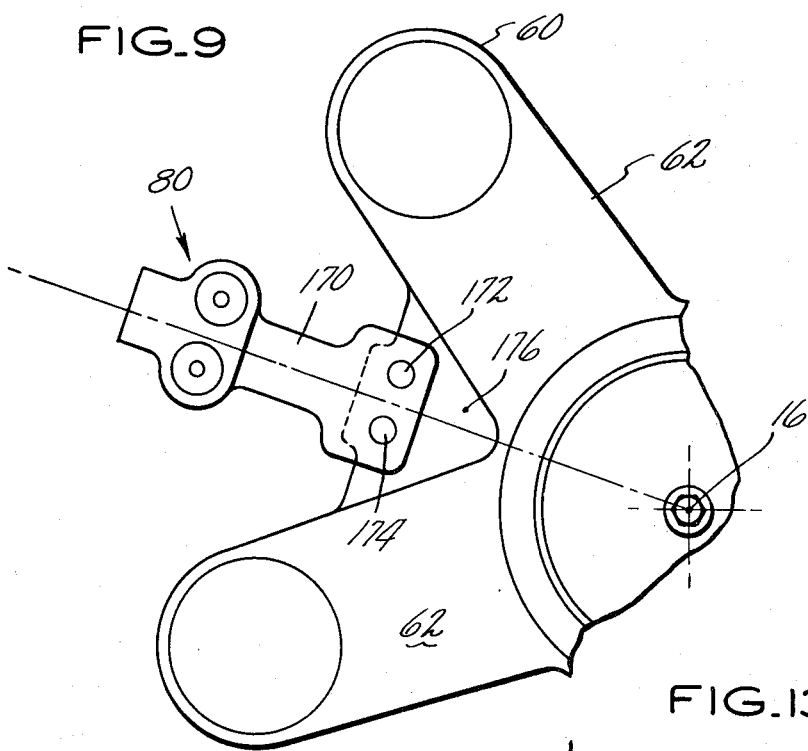
FIG. 9 is a partial plan view of a helicopter rotor showing one of the bifilar vibration absorbers of a vibration absorber system attached directly to the rotor hub.

While star shaped support member 70 is utilized in the FIG. 6, 7 and 8 constructions, it should be borne in mind that the bifilar counterweights could as well be supported directly from rotor hub assembly 60, wherein, as best shown in FIG. 9, bifilar absorbers 80 are supported from support arms 170 which are connected by bolt means 172 and 174 to web section 176, which extends between plate members 62 of rotor hub 60.

There is no relationship between the number of absorbers and the number of blades in the rotor in our construction.

Figure 10:
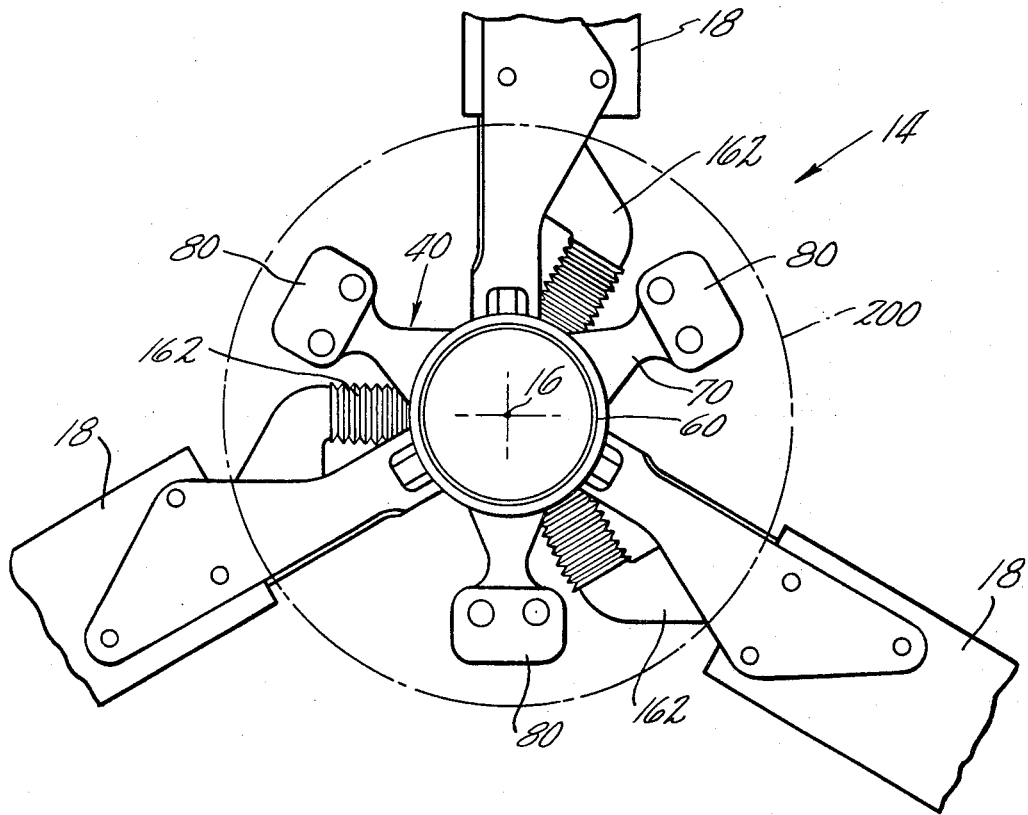
FIG. 10 is a plan view of our vibration damper system shown on a three bladed, hot cycle helicopter.
Figure 11:
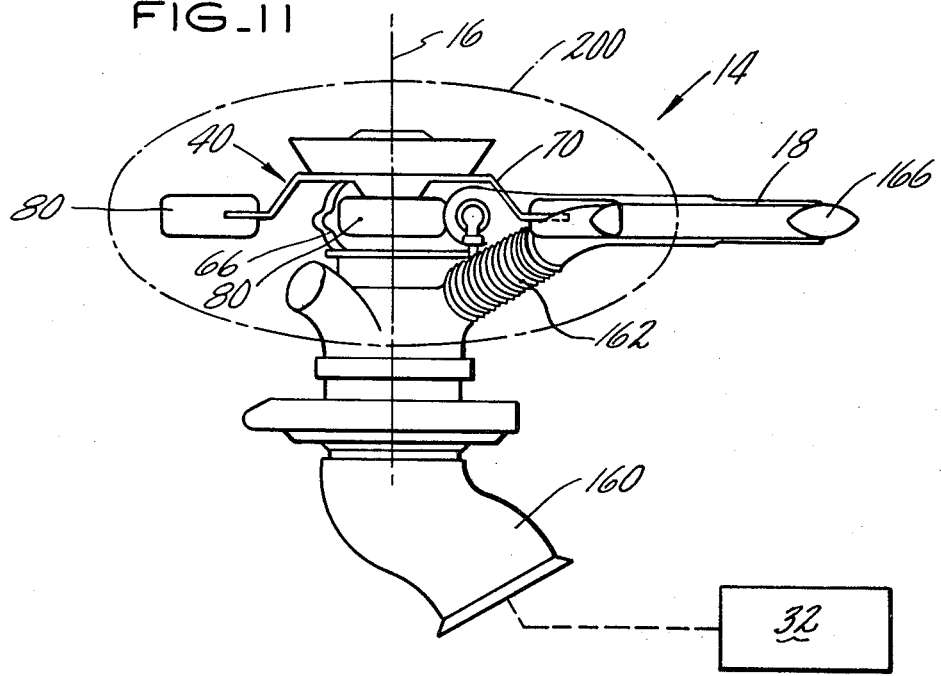
FIG. 11 is a side view of the construction shown in FIG. 10.

FIGS. 10 and 11 show our bifilar vibration assembly 40 used in a three-bladed hot-cycle helicopter rotor. Three blades 18 are mounted for rotation with hub 60 about axis of rotation 16. Three equally spaced bifilar counterweights 80 are supported for rotation with rotor 14 by support member 70 which extends from and is supported from hub assembly 60. Blades 18 are caused to rotate by hot gases which are delivered from engine 32 thereto through appropriate ducting and including duct 160 and from which the hot engine gases flow through flexible ducts 162 into the interior of hollow blades 18 to be discharged therefrom through exhaust nozzles 166 in the tips of each blade to thereby cause rotation of rotor 14. Rotor hub 60 is enveloped within drag abatement housing 200, through which blades 18 project.

The invention permits the damping of in-plane rotor vibrations in a helicopter rotor with a minimum addition of weight, without respect to the number of rotor blades, and in a manner which is unaffected by the changes in rotor r.p.m.

While we have illustrated and described our vibration absorber system as positioned and tuned to absorb inplane rotor vibrations, and this, of course, includes both longitudinal and lateral vibrations, it will be evident to those skilled in the art that the vibration dampers could be positioned, oriented, and tuned to absorb vertical rotor vibrations. In addition, roll, pitch and rotor torque moment cancellation can also be accomplished by proper absorber tuning, whether the absorbers are oriented to absorb in-plane or vertical vibrations. In short, the vibration dampers taught herein are capable of absorbing or cancelling vibrations in all six degrees of rotor freedom.

It should further be borne in mind that while we have shown and described the pendulous mass 86 as being a U-shaped cross section, in rotors having differently shaped support mechanisms for the pendulous mass, this might not necessarily be the case. For example, if the support member 70 were of U-shaped cross section or otherwise shaped to present two spaced support plates, the pendulous member could then be fabricated to be flat as the support member 70 is illustrated to be in this application. The shape of the connected portions of the pendulous member 86 and support member 70 would then be the reverse of that disclosed.

I wish it to be understood that I do not desire to be limited to the exact details of construction shown and described for obvious modifications will occur to a person skilled in the art.

What is claimed is:

1. A bifilar vibration damper including:
    (a) a support member adapted to extend radially from and to be rotated in a plane about an axis of rotation and having two apertures of substantially circular cross section extending therethrough and being concentric about parallel axes which are parallel to and equidistant from said axis of rotation,
    (b) a pin member extending through each of said apertures of said support member and being of substantially circular cross section and concentric about a straight line axis and having a diameter less than the diameter of said support member apertures,
    (c) a pendulous member of U-shaped cross section having substantially parallel side plate members positioned on opposite sides of said support member and spaced so as to define a selected spacing distance from said support member when said pendulous member is centered laterally with respect to said support member, each side plate member having two apertures extending therethrough of substantially circular cross section and of substantially the same diameter as said support member apertures and with the apertures each of said side plate members coaxial respectively with the apertures of the other side plate member and with the coaxial apertures of said side plate members enveloping one of said pin members so as to support said pendulous member from said support members for pendulous relative motion therebetween as said pins roll in said apertures during rotation of said support member about said axis of rotation with the axes of all apertures and pin members parallel to each other and to the rotor axis of rotation,
    (d) an annular spacer member positioned between said support member and each of said side plate members and connected at its inner diameter to said pin member and being of maximum width at its inner diameter, which maximum width is less than said spacing distance between said side plate members and said support member, and being of minimum width at its outer diameter so as to be wedge shaped, tapering in width in a direction away from said pin member and having an outer diameter greater than the diameter of said side plate member and support member apertures to retain said pins in said apertures and so that solely line contact is established between said spacer members and said support and side plate members during operation.

2. Apparatus according to claim 1 wherein said pin members are of selected diameter with respect to the diameters of said apertures in said pendulous member and said support member to tune said vibration damper.

3. A helicopter having:
    (a) a fuselage which is sensitive to rotor inplane vibrations and relatively insensitive to rotor vertical vibrations,
    (b) a plural bladed helicopter rotor,
    (c) means mounting said rotor from said fuselage so that said rotor is rotatable about an axis of rotation,
    (d) means to drive said rotor in rotation so as to establish rotor inplane vibrations,
    (e) vibration absorbing means mounted for rotation with said rotor and including at least three bifilar vibration dampers.

4. Apparatus according to claim 3 wherein said rotor has at least five blades.

5. Apparatus according to claim 3 wherein said vibration absorbing means includes at least six bifilar vibration dampers with three of said dampers tuned to absorb a particular rotor inplane frequency and the remaining three of said absorbers tuned to absorb a different rotor inplane frequency.

6. Apparatus according to claim 3 wherein said helicopter rotor is of the hot-cycle type.

7. Apparatus according to claim 3 wherein said vibration absorbing means includes a star shaped support member mounted for rotation with said rotor and including at least three points projecting radially from the star in a plane perpendicular to the rotor axis of rotation, and a bifilar vibration damper attached to the outer periphery of each of the star points and tuned to damp rotor inplane vibrations.

8. Apparatus according to claim 3 wherein the inplane vibrations of the rotor is at frequency $(n+1)$ multiplied by the rotor r.p.m. and $(n+1)$ multiplied by the rotor r.p.m., where $n$ is the number of rotor blades so as to impart a vertical fuselage vibration at frequency $n$ multiplied by rotor r.p.m., and wherein said vibration dampers are tuned to absorb the rotor inplane vibrations at both frequencies.

9. A bifilar vibration damper including:
(a) a support member adapted to extend radially from and to be rotated in a plane about an axis of rotation and having two apertures of substantially circular cross section extending therethrough and being concentric about parallel axes which are parallel to and equally distant from said axis of rotation,
(b) a pendulous member of U-shaped cross section and having substantially parallel side plate members adapted to be positioned on opposite sides of said support member and spaced so as to define a selected spacing distance from said support member when said pendulous member is centered laterally with respect to said support member, and each having two apertures extending therethrough of substantially circular cross section and concentric about parallel axes which are substantially parallel to said axis of rotation and of substantially the same diameter as said support member apertures, and with the apertures in each side plate member in alignment respectively with the apertures of the other side plate member,
(c) a pin member extending through each of said apertures of said support member and said aligned apertures of said side plate members to connect said pendulous member to said support member and being of substantially circular cross section and concentric about a straight line axis and having a diameter less than the diameter of said support member apertures,
(d) an annular spacer member positioned between said support member and each of said side plate members and connected at its inner diameter to said pin member and being of maximum width at its inner diameter, which maximum width is less than said spacing distance between said side plate members and said support member and being of minimum width at its outer diameter so as to be wedge shaped tapering in width in a direction away from said pin member and having an outer diameter greater than the diameter of said side plate member and support member apertures to retain said pins in said apertures and so that solely line contact is established between said spacer members and said support and side plate members during operation.

10. Apparatus according to claim 3 wherein each of said bifilar vibration dampers includes:
(a) a support member adapted to extend radially from and to be rotated in a plane perpendicular to said rotor axis of rotation and having two apertures of substantially circular cross section extending therethrough and being concentric about parallel axes which are parallel to and equally distant from said rotor axis of rotation,
(b) a pin member extending through each of said apertures of said support member and being of substantially circular cross section and concentric about a straight line axis and having a diameter less than the diameter of said support member apertures,
(c) a pendulous member of U-shaped cross section having substantially parallel side plate members positioned on opposite sides of said support member and spaced so as to define a selected spacing distance from said support member when said pendulous member is centered laterally with respect to said support member, each side plate member having two apertures extending therethrough of substantial circular cross section and of substantially the same diameter as said support member apertures and with the apertures of each of said side plate members coaxial respectively with the apertures of the other side plate member and with the coaxial apertures of said side plate members enveloping one of said pin members so as to support said pendulous member from said support member for pendulous relative motion therebetween as said pins roll in said apertures during rotation of said support member about said axis of rotation with the axes of all apertures and pin members parallel to each other and parallel to the rotor axis of rotation,
(d) an annular spacer member positioned between said support member and each of said side plate members and connected at its inner diameter to said pin member and being of maximum width at its inner diameter, which maximum width is less than said spacing distance between said side plate members and said support member, and being of minimum width at its outer diameter so as to be wedge shaped tapering in width in a direction away from said pin member and having an outer diameter greater than the diameter of said side plate member and support member apertures to retain said pins in said apertures and so that solely line contact is established between said spacer members and said support and side plate members during operation.

11. A helicopter including:
(a) a fuselage with low sensitivity to rotor vertical vibrations and high sensitivity to rotor inplane vibrations,
(b) a rotor supported for rotation from said fuselage and including a plurality of blades mounted for rotation about an axis of rotation,
(c) at least three bifilar vibration dampers connected to said rotor for rotation therewith in a plane substantially perpendicular to said axis of rotation.

12. Apparatus according to claim 11 wherein said rotor establishes inplane vibrations during rotation having rotational frequencies equal to the number of rotor blades plus one and the number of rotor blades minus one, which vibrations are rotating in opposite directions so as to impart a vertical vibration to the fuselage having a frequency equal to the number of rotor blades times rotor revolutions per minute and wherein said vibration dampers are tuned to dampen at least one of said rotor inplane vibrations.

13. Apparatus according to claim 11 including two sets of at least three bifilar vibration dampers attached to said rotor for rotation therewith in a plane substantially perpendicular to the rotor axis of rotation and wherein one set is tuned to dampen the rotor inplane vibrations haivng a rotational frequency equal to the number of blades plus one and the other set is tuned to dampen the rotor inplane vibrations having a rotational freqeuncy equal to the number of blades minus one.

14. A helicopter including:
(a) a fuselage having high sensitivity to rotor vibrations in a first direction,
(b) a rotor supported for rotation from said fuselage and including a plurality of blades mounted for rotation about an axis of rotation,
(c) at least three bifilar vibration dampers connected to said rotor for rotation therewith and each oriented in a plane substantially parallel to said first direction.

15. Apparatus according to claim 11 wherein each of said bifilar vibration dampers includes:
(a) a support member adapted to extend radially from and to be rotated in a plane perpendicular to said rotor axis of rotation and having two apertures of substantially circular cross section extending therethrough and being concentric about parallel axis which are parallel to and equally distant from said rotor axis of rotation,
(b) a pin member extending through each of said apertures of said support member and being of substantially circular cross section and concentric about a straight line axis and having a diameter less than the diameter of said support member apertures,
(c) a pendulous member of U-shaped cross section having substantially parallel side plate members positioned on opposite sides of said support member and spaced so as to define a selected spacing distance from said support member when said pendulous member is centered laterally with respect to said support member, each side plate member having two apertures extending therethrough of substantial circular cross section and of substantially the same diameter as said support member apertures and with the apertures of each of said side plate members coaxial respectively with the apertures of the other side plate member and with the coaxial apertures of said side plate members enveloping one of said pin members so as to support said pendulous member from said support member for pendulous relative motion therebetween as said pins roll in said apertures during rotation of said support member about said axis of rotation with the axes of all apertures and pin members parallel to each other and parallel to the rotor axis of rotation, (d) an annular spacer member positioned between said support member and each of said side plate members and connected at its inner diameter to said pin member and being of maximum width at its inner diameter, which maximum width is less than said spacing distance between said side plate members and said support member, and being of minimum width at its outer diameter so as to be wedge shaped tapering in width in a direction away from said pin member and having an outer diameter greater than the diameter of said side plate member and support member apertures to retain said pins in said apertures and so that solely line contact is established between said spacer members and said support and side plate members during operation.

16. A bifilar vibration damper including:
(a) a support member adapted to extend radially from and to be rotated in a plane about an axis of rotation,
(b) a pendulous member adapted to be connected to said support members for rotation therewith,
(c) means connecting said pendulous member to said support members including:
  (1) a first member connected to one of said support or pendulous members and having two apertures of substantialy circular cross section extending therethrough,
  (2) a pin member extending through each of said apertures of said first member and being of substantially circular cross section and concentric about a straight line axis and having a diameter less than the diameter of said first member apertures,
  (3) a second member connected to the other of said support or pendulous members and having substantially parallel portions positioned on opposite sides of said first member and spaced so as to define a selected spacing distance from said first member when said pendulous member is centered laterally with respect to said support member, each portion of said second member having two apertures extending therethrough of substantially circular cross section and of substantially the same diameter as said first member apertures and with the apertures of each of said portions of said second member being coaxial respectively with the apertures of the other portion of said second member and with the coaxial apertures of said portions enveloping one of said pin members so as to support said pendulous member from said support member for pendulous relative motion therebetween as said pins roll in said apertures during rotation of said support member about said axis of rotation with the axes of all apertures and pin members parallel to each other,
  (4) an annular spacer member positioned between said first member and each of said portions of said second member and connected at its inner diameter to said pin member and being of maximum width at its inner diameter, which maximum width is less than said spacing distance between said portions of said second member and said first member, and being of minimum width at its outer diameter so as to be wedge shaped, tapering in width in a direction away from said pin member and having an outer diameter greater than the diameter of said first and second member apertures to retain said pins in said apertures and so that solely line contact is established between said spacer members and said first and second members during operation.

17. A helicopter having:
(a) a fuselage,
(b) a plural bladed helicopter rotor,
(c) means mounting said rotor from said fuselage so that said rotor is rotatable about an axis of rotation,
(d) means to drive said rotor in rotation so as to establish rotor vibrations,
(e) vibration absorbing means mounted for rotation with said rotor and including at least three bifilar vibration dampers tuned to substantially the frequency of said rotor vibration.

18. The method of damping in-plane vibrations in a helicopter rotor comprising selectively supporting and positioning bifilar vibration dampers for rotation with a helicopter rotor and so that the movable counterweight member thereof is free to move relative to the helicopter rotor in the plane of rotor rotation.

19. The method of damping in-plane vibrations in a helicopter rotor comprising selectively supporting and positioning at least one series of at least three bifilar vibration dampers for rotations with helicopter rotor and so that the movable counterweight members thereof are free to move relative to the helicopter rotor in the plane of rotor rotation.

20. The method of damping in-plane vibrations in a helicopter rotor having a number of blades equal to $n$ and mounted for rotation to establish in-plane vibrations having oppositely directed rotational frequencies of $(n-1)$ and $(n+1)$ comprising selectively supporting and positioning bifilar vibration dampers tuned to dampen frequencies of $(n-1)$ for rotation with the helicopter rotor and so that the movable counterweight members thereof are free to move relative to the helicopter rotor in the plane of rotor rotation, and selectively supporting and positioning bifilar vibration dampers tuned to dampen frequencies of $(n+1)$ for rotation with a helicopter rotor and so that the movable counterweight members thereof are free to move relative to the helicopter rotor in the plane of rotor rotation.

References Cited

UNITED STATES PATENTS

| 2,280,360 | 4/1942 | Atteslander | 74—574 |
| 2,343,421 | 3/1944 | Porter | 74—574 |
| 2,348,941 | 5/1944 | Ware | 74—574 |
| 2,480,946 | 9/1949 | McDowell et. al. | 74—574 |
| 3,372,758 | 3/1968 | Jenny | 170—159 |

FOREIGN PATENTS

| 773,520 | 9/1934 | France. |
| 1,100,498 | 2/1961 | Germany. |

EVERETTE A. POWELL, Jr., Primary Examiner

U.S. Cl. X.R.

416—144, 500

PO-1050
(5/69)

UNITED STATES PATENT OFFICE
CERTIFICATE OF CORRECTION

Patent No. 3,540,809          Dated November 17, 1970

Inventor(s) William F. Paul and Kenneth C. Mard

It is certified that error appears in the above-identified patent and that said Letters Patent are hereby corrected as shown below:

Claim 8, line 3, column 12      Delete "(n+1)" and insert --(n-1)--

Claim 15, line 7, column 14     Delete "axis" and insert --axes--

SIGNED AND
SEALED
MAR 2 1971

(SEAL)
Attest:

Edward M. Fletcher, Jr.
Attesting Officer

WILLIAM E. SCHUYLER, JR.
Commissioner of Patents

PC-1050
(5/63)

UNITED STATES PATENT OFFICE
CERTIFICATE OF CORRECTION

Patent No. 3,540,809          Dated November 17, 1970

Inventor(s) WILLIAM F. PAUL & KENNETH C. MARD

It is certified that error appears in the above-identified patent and that said Letters Patent are hereby corrected as shown below:

Column 7, line 53    Delete "turning" and insert --tuning--

Column 8, line 15    Delete "$W_T = n \Omega$" and insert $$--W_T = (n-1) \Omega--$$

Column 8, line 17    Delete "$W_T^2 = [(n)(3.38)(2\pi)]^2$" and insert $--W_T^2 = [(n-1)(3.38)(2\pi)]^2--$ Signed and sealed this 26th day of October 1971.

(SEAL)
Attest:

EDWARD M. FLETCHER, JR.
Attesting Officer

ROBERT GOTTSCHALK
Acting Commissioner of Patents